Jan. 22, 1952  R. RITTER ET AL  2,583,016
FRAME STRUCTURE FOR MOBILE VINERS
Filed March 28, 1949  6 Sheets-Sheet 1
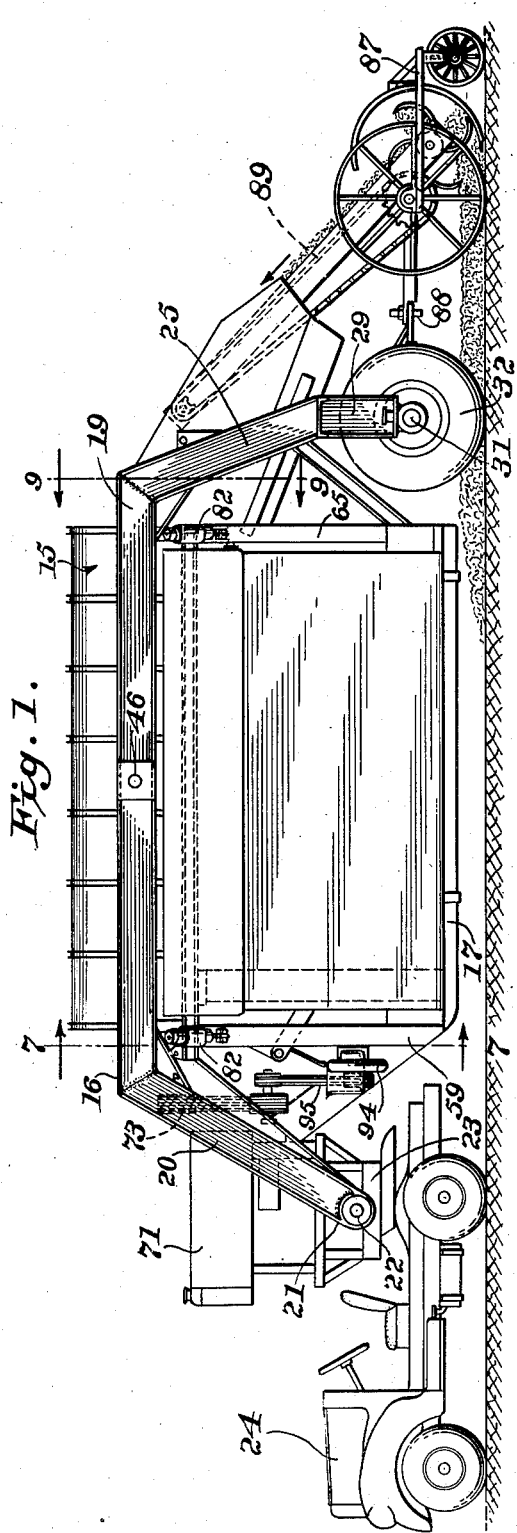
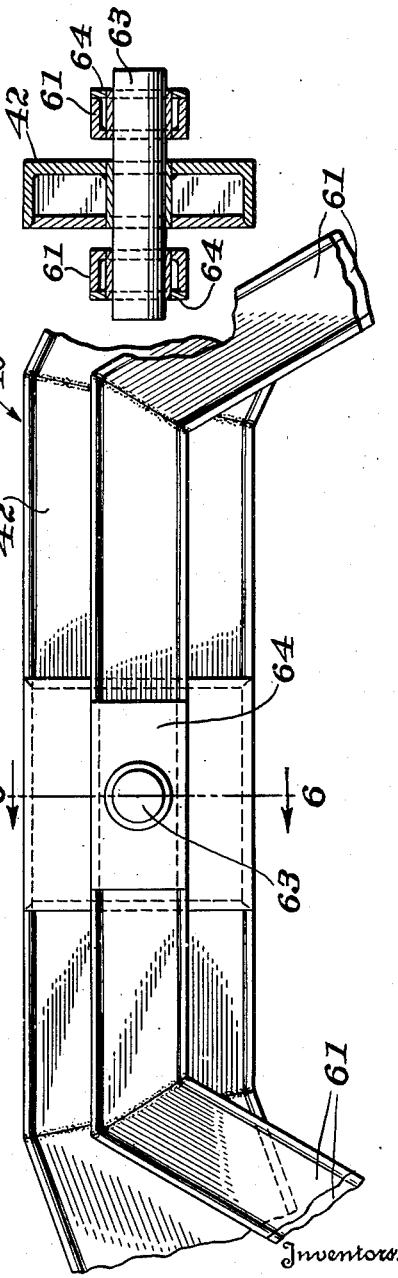
Inventors:
Roy Ritter,
William Ritter,
By Cushman Darby Cushman
ATTORNEYS.

Jan. 22, 1952 R. RITTER ET AL 2,583,016
FRAME STRUCTURE FOR MOBILE VINERS
Filed March 28, 1949 6 Sheets-Sheet 2
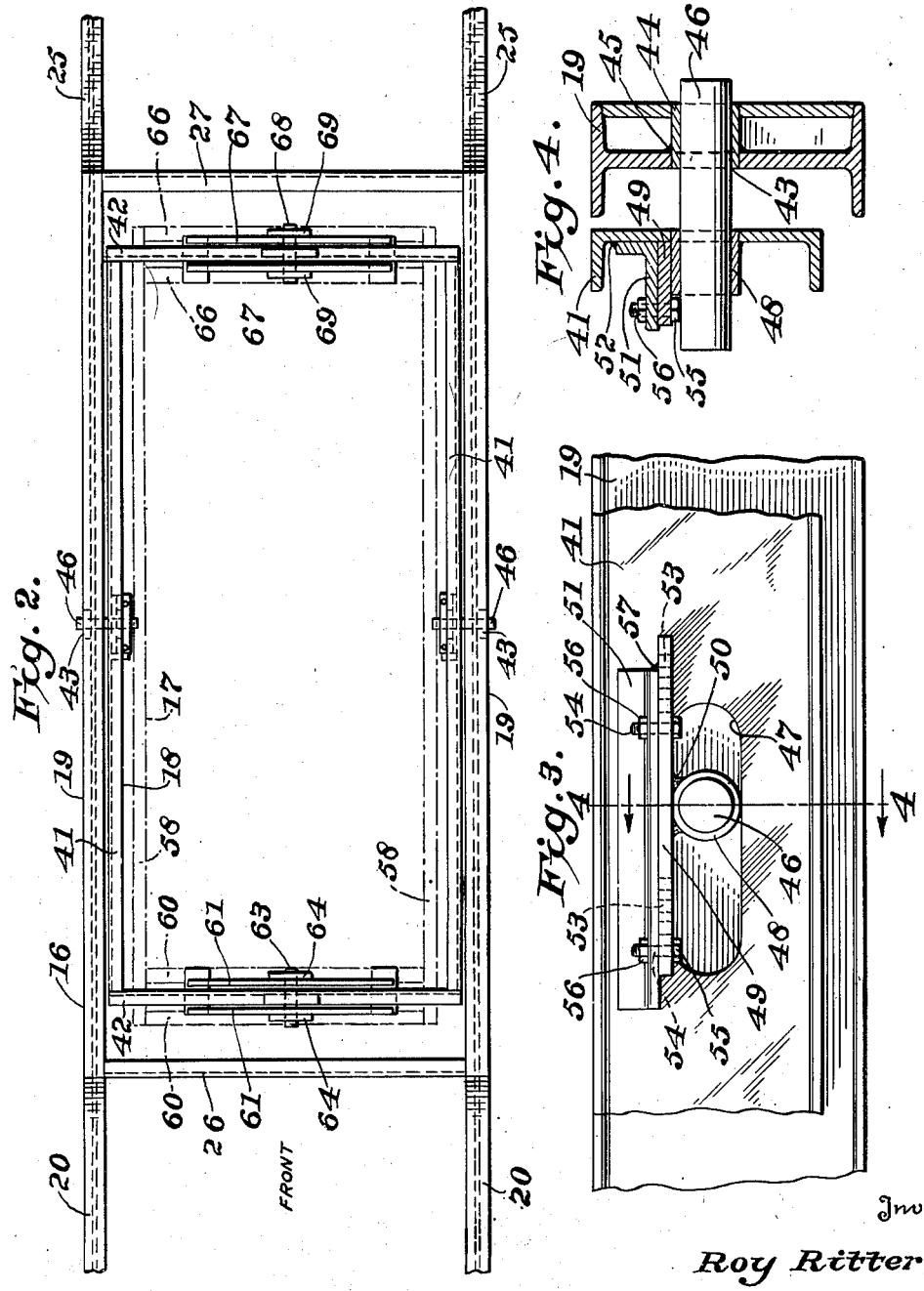
Inventors:
Roy Ritter,
William Ritter,
By
ATTORNEYS.

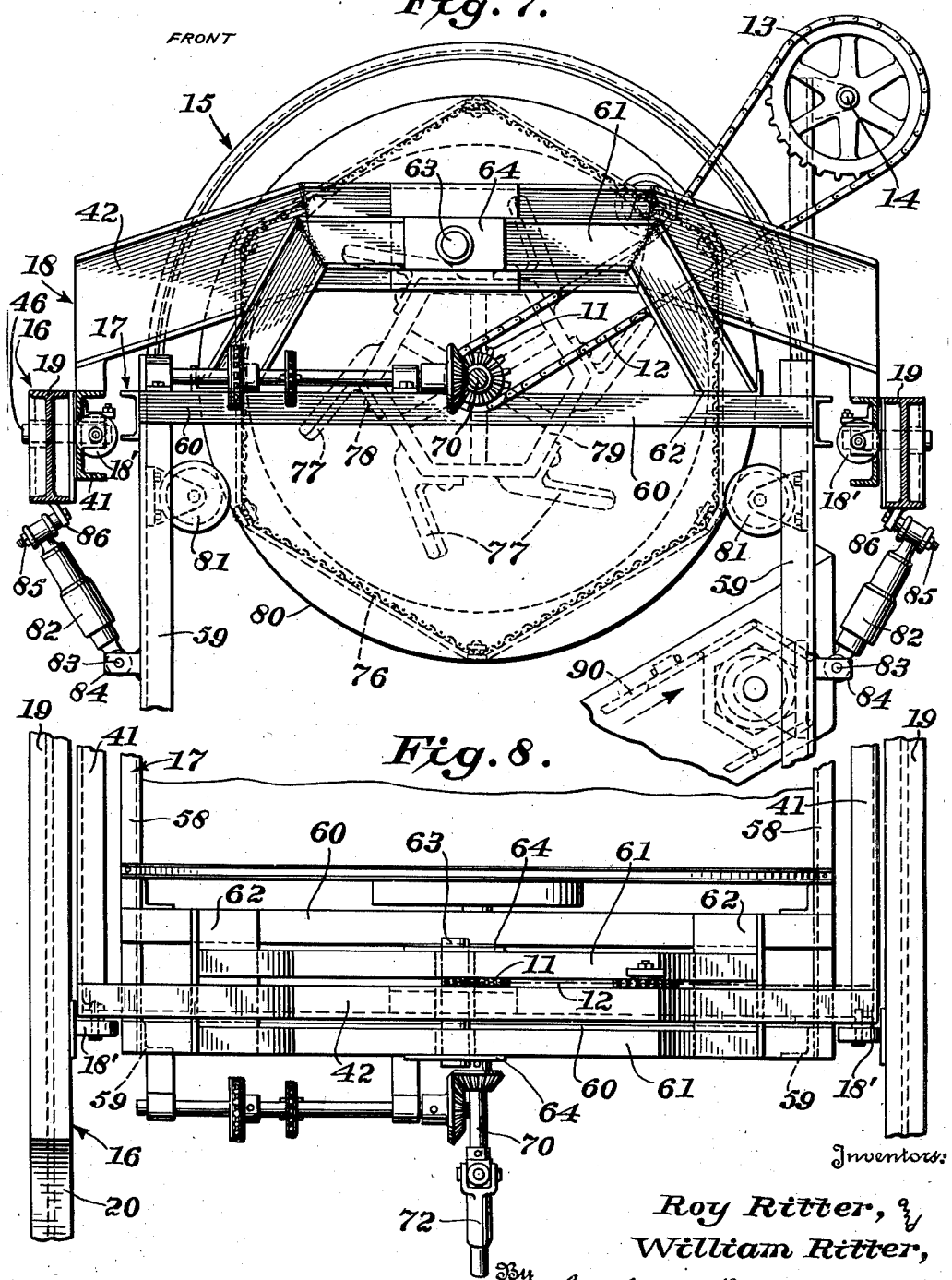

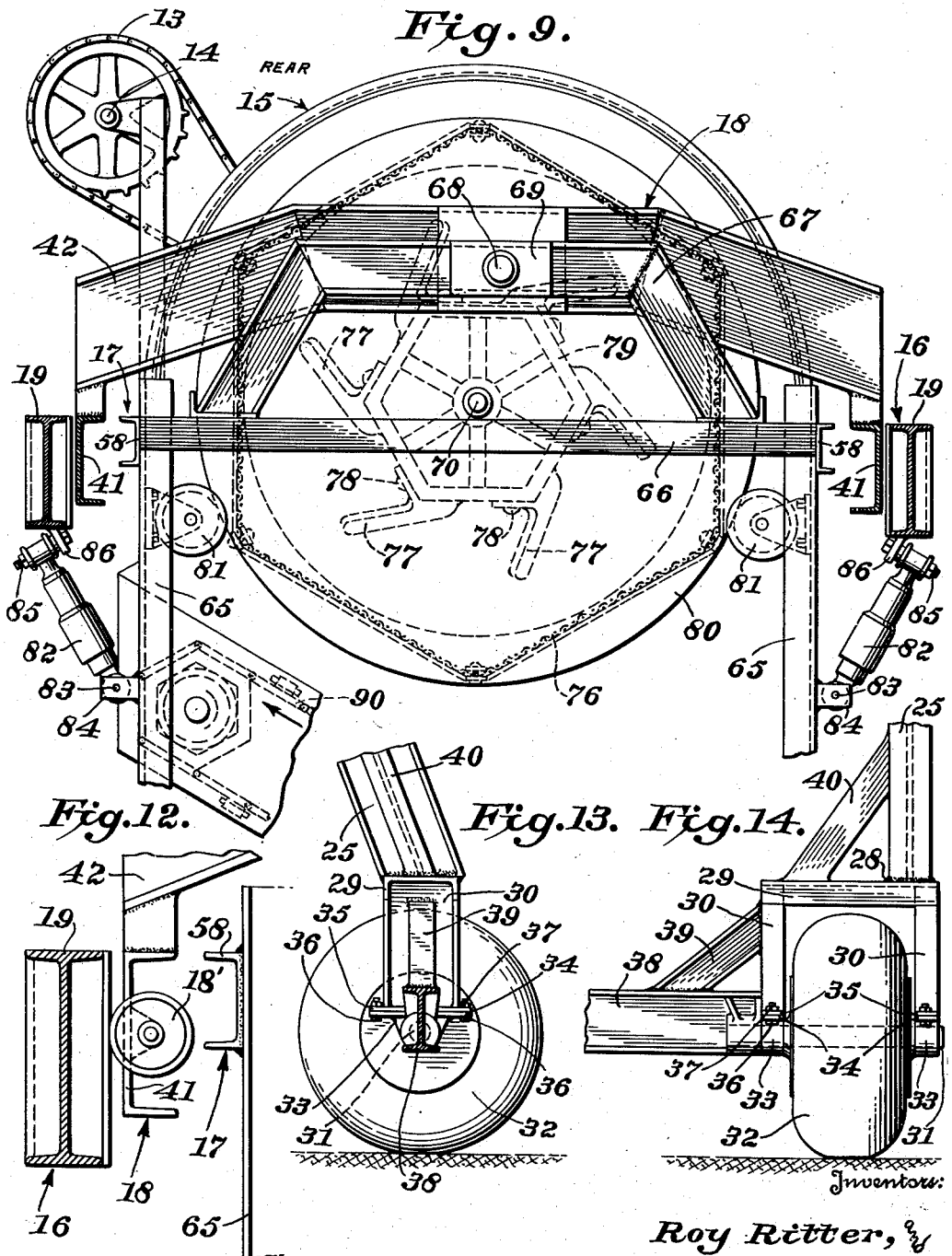

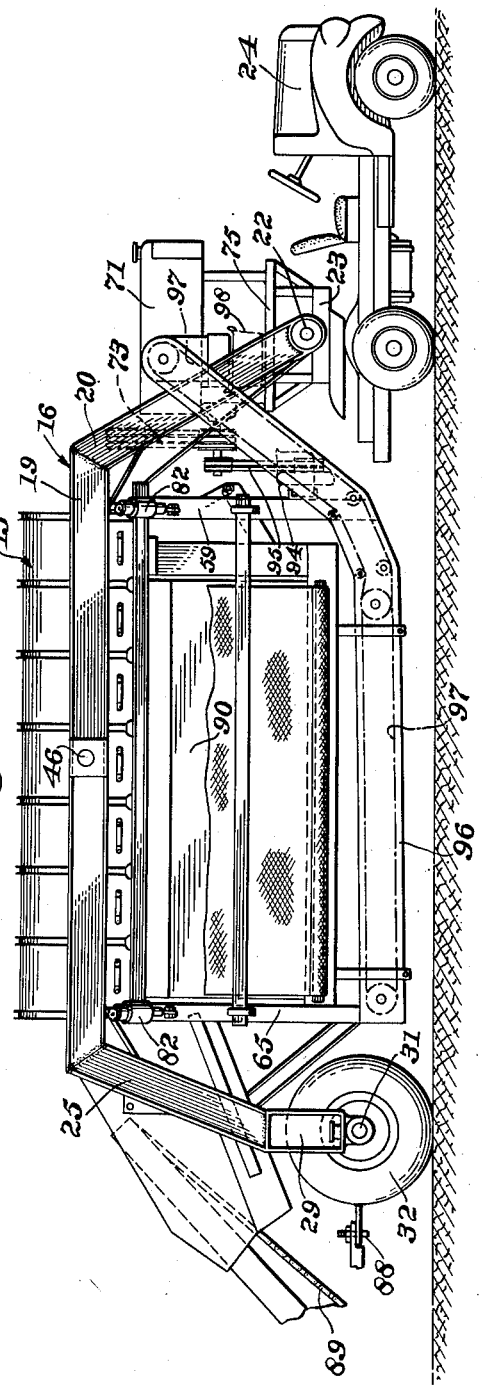

Patented Jan. 22, 1952

2,583,016

UNITED STATES PATENT OFFICE 2,583,016

FRAME STRUCTURE FOR MOBILE VINERS

Roy Ritter and William Ritter, Lewes, Del.

Application March 28, 1949, Serial No. 83,922

8 Claims. (Cl. 280—106)

The present invention relates to harvesters and, more particularly, to improvements in mobile viner hulling machines as embodied in our copending application Serial No. 725,212, filed January 30, 1947.

An important object consists in providing a mobile viner hulling machine with a main outer frame having longitudinally extending spaced side bars positioned above the center of gravity of the machine, associating with the main frame a machine frame positioned within the main frame, and interposing between the main frame and the machine frame, a cradle frame having spaced longitudinal side bars provided with means intermediate their ends for adjustably and pivotally connecting the cradle frame to the main frame above the center of gravity of the machine in order to properly balance the cradle frame relative to the machine. Additionally, means mounted on opposite ends of the machine frame are provided for pivotally connecting centrally the ends of the cradle frame thereto. The pivotal suspension of the cradle frame to the sides of the main frame and to the ends of the machine frame above the center of gravity of the machine providing simple, efficient and positive means for maintaining the cradle frame substantially level upon displacement of the main frame and the machine frame when the mobile viner passes over uneven ground.

A further object consists in connecting the machine frame to the main frame at the side and ends thereof by shock absorbing or cushioning means so as to restrain lateral displacement and limit swaying of the frame members when the machine is going down or up a hill or travelling over rough and hilly ground.

Other objects and advantages of the invention will become apparent from the following description when taken in conjunction with the accompanying claims and drawings.

Referring to the drawings in which is shown a preferred embodiment of the invention:

Figure 1 is a side view of a viner machine constructed in accordance with the invention and shown connected to a tractor and a loading device.

Figure 2 is a detail plan view of the main frame, machine frame and cradle frame showing the points of suspension of the cradle frame to the main frame and the machine frame.

Figure 3 is a detail side view showing the pivotal connection of the cradle frame to the main frame.

Figure 4 is a sectional view taken substantially along the line 4—4 of Figure 3.

Figure 5 is an enlarged detail front end view of the frame structure showing the pivotal connection of the cradle frame to the machine frame.

Figure 6 is a sectional view taken substantially along the line 6—6 of Figure 5.

Figure 7 is a sectional view taken substantially along the line 7—7 of Figure 1.

Figure 8 is a fragmentary detail plan view of the forward end portion of the frame structure.

Figure 9 is a sectional view taken substantially along the line 9—9 of Figure 1.

Figure 10 is a side view of the machine taken from the side opposite to that of Figure 1.

Figure 11 is an enlarged detail side elevation of the forward end of the viner showing its operative connection to a tractor or the like.

Figure 12 is an enlarged fragmentary detail view of one side of the machine.

Figure 13 is a detail side view of one of the supporting wheels, and

Figure 14 is a front view of Figure 13.

Figure 11:
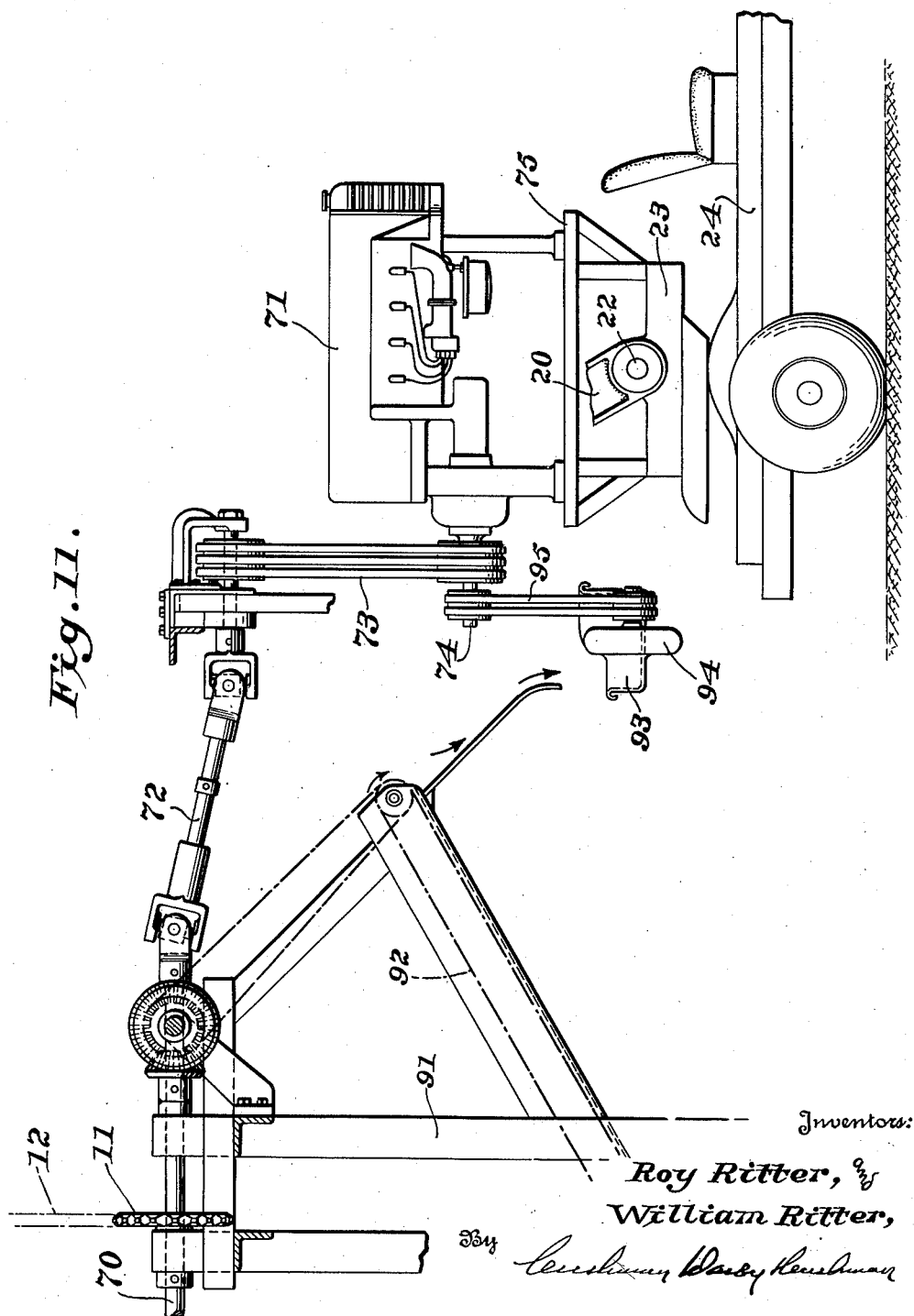

Referring to the drawings in which like numerals indicate like parts in the several views, 15 (Fig. 1) designates the improved mobile viner hulling machine which preferably comprises a main outer frame 16 of substantially rectangular shape (Fig. 2), a machine frame 17 within the main frame, and a cradle frame 18 positioned between the main frame and the machine frame. The main outer frame 16 is formed with spaced pairs of longitudinally disposed side bars 19 which extend downwardly at their forward ends to form the inclined bars or portions 20 that are welded or otherwise connected as at 21 (Fig. 1) to a transverse cylindrical member 22 that is fixedly mounted on a base or platform 23 which may be pivotally and detachably connected to a tractor or the like 24 in any suitable manner.

The side bars 19 of the main frame at their rear or opposite ends have downwardly inclined bars or portions 25 and are connected adjacent their front and rear ends by the transverse bars or pieces 26 and 27, respectively (Fig. 2). The lower ends of each of the inclined bars 25 are welded or otherwise connected as at 28 (Fig. 14) to an inverted substantially U-shaped wheel supporting member 29 having spaced depending arms 30 between which is journalled the shaft 31 of a rear tractor wheel 32. The shaft 31 may be journalled in the spaced bearings 33 having flanges 34 (Fig. 13) which abut adjacent flanges 35 on the arms 30 so as to be detachably clamped thereto by the threaded bolts 36 and nuts 37. A transverse brace bar 38 is welded or otherwise connected at its ends to the inner arms 30 so as to impart rigidity to the wheel supporting structure. Inclined braces 39 and 40 may also be provided to reinforce the wheel structure.

The cradle frame 18 is formed with longitudinally extending side bars 41 connected by front and rear cross bars 42 at opposite ends thereof (Fig. 2). The side bars 19 of the main frame substantially centrally of the length thereof are formed with transverse aligned through openings 43 to the walls of which are connected tubular bushing members 44 (Fig. 4) in any suitable manner such as by welding as at 45. Mounted in the bushings 44 and extending inwardly from the bars 19 of the main frame are pivot pins or shafts 46. Each of the side bars 41 of the cradle frame 18 is formed adjacent the center thereof with a longitudinally extending slot 47 through which loosely extends the inner portion of a pivot pin 46 (Fig. 3). Loosely mounted on pin 46 and arranged to be movable in the slot 47 of each side bar 41 is a collar or sleeve 48 to which is tangentially connected a longitudinally extending plate or member 49 such as by welding 50 so that the plate 49 is positioned parallel and adjacent to the upper edge of the slot 47. An angle bar or plate 51 is connected such as by welding 52 to the inner side of the cradle bar 41 so as to overlap and be movable longitudinally relative to the plate 49 carried by the collar 48. The plate 49 is provided with longitudinally disposed spaced openings 53 on opposite sides of the pin 46 which are arranged to register with one of a pair of spaced openings 54 in the plate 51 and be secured thereto by the threaded bolts 55 and nuts 56. When initially mounting the cradle frame 18 on the machine in order to insure proper balance of the cradle at a point above the center of gravity of the machine, the side bars 41 of the cradle frame and the plates 51 may be moved longitudinally relative to the pivot pins 46 and plates 49 so that when the cradle frame is in proper balanced position, such as shown in Figure 3, the bolts 55 and nuts 56 clamp each plate 49, which is mounted on the pivot pin 46, to the plate 51 and then the plate 49 may be welded as at 57 to the plate 51 in order to assist the bolts 55 in maintaining the cradle in its proper balanced position relative to the viner machine 15.

The machine frame 17 has longitudinally extending side bars 58 (Fig. 8), and at its forward end is provided with upwardly extending spaced vertical bars 59 connected by spaced cross bars 60 on which are mounted a pair of spaced hanger bars 61 as at 62. The front cross bar 42 of the cradle frame 18 is shaped as shown in Figure 7, and extends between the spaced bars 61 so as to be pivotally connected thereto at its transverse center by the pin 63 supported on opposite sides of the bars 61 by the spaced bearing blocks 64. The rear end of the machine frame is similarly provided with upwardly extending spaced vertical bars 65 (Fig. 9) which at their upper ends are connected by spaced transverse bars 66 on which are mounted a pair of spaced supporting bars or members 67 similar in construction to the bar 61 previously described. The rear cross bar 42 of the cradle frame 18 extends between the bars 67 and is centrally pivotally connected thereto by the pin 68 supported by the bearing blocks 69. Thus, it will be seen that the end pivotal suspension members or pins 63 and 68 coact with the side pivotal suspension members 43 at points about the center of gravity of the machine to insure the cradle frame 18 being maintained substantially in a horizontal position upon longitudinal or lateral displacement of the machine when travelling over uneven or hilly ground. Rollers 18' on the side bars 41 of the cradle frame (Fig. 7) engage the inner surface of the side bars 19 of the main frame to prevent lateral swinging movement of the cradle frame.

Extending longitudinally and centrally of the machine is a revoluble drive shaft 70 which may be operatively connected to the engine 71 (Fig. 11) through a flexible universal joint shaft assembly 72 and the endless belt drive mechanism 73 that is connected to the engine shaft 74. The engine 71 may be mounted on a stand 75 carried by the base 23, and is operatively connected to the various rotating parts of the machine for separating the beans from the vines and pods in a continuous operation as the machine is moved over a field, and in substantially the same manner as the driving means disclosed in our copending application, Serial No. 725,212. When the viner machine is not in use, the forward end thereof may be supported by an adjustable jack, not shown, which permits the tractor 24 to be moved so as to be pivotally connected to the viner.

The revoluble sieve or screen drum 76 is carried by the cradle frame 18 and is operatively connected by a sprocket wheel 11 (Fig. 7) and an endless chain 12 to sprocket wheel 13 on countershaft 14 that in turn is operated by the engine 71. Rotary hulling beaters 77 within the screen drum 76 are connected as at 78 to a beater drum 79 keyed or otherwise operatively connected to the drive shaft 70 so as to rotate in the same direction as the drum 76. The revoluble sieve drum 76 at its ends is enclosed in a casing 80 and is supported in the cradle frame by rollers 81 carried by the arms 59 and 65, respectively.

The front vertical bars 59 and the rear vertical bars 65 of the cradle frame 17 are preferably connected to the side bars 19 of the main frame by shock absorbers 82, which at their lower ends are pivotally connected as at 83 to spaced lugs 84 on the vertical bars 59 and 65, respectively (Fig. 7), and are pivotally connected at their upper ends as at 85 to lugs 86 which extend downwardly from the side bars 19 of the main frame. Thus, it will be seen that the shock absorbers provide means for restraining lateral or swaying movement of the main frame and the machine frame when the same are displaced due to irregularities in the surface over which the machine travels.

In operating the mobile viner hulling machine before the tractor is connected to the forward end of the machine, the viner may be supported by an adjustable jack and in order that the cradle frame 18 may be properly balanced, longitudinal adjustment of the cradle is effected by moving the side bars 41 of the cradle frame relative to the pivot pins 46 until the cradle frame is in proper balanced position. The clamping bolts 55 are then applied to the plates 49 and 51 in the manner as previously described, and the side bars 41 are maintained in a fixed longitudinal position relative to their adjacent side bars 19 of the main frame by welding the plates 49 and 51 as at 57. The tractor 24 is then connected to the forward end of the viner and a vine loader 87 is connected as at 88 to the rear end of the viner so as to transfer the vines with the pods attached to a receiving chute 89 from where the vines are discharged into the rotary sieve drum 76 so as to be acted on by the hulling beaters 77 in order to break the pods and liberate the beans. The openings in the sieve drum are sufficient to allow the beans to fall therein onto an inclined separating apron 90 (Fig. 7) which extends transversely of the machine and beneath the sieve drum 76, and which is substantially similar in construction and operation to the separating apron disclosed in our copending application, Serial No. 725,212. The treated vines, open pods and tailings are discharged from the forward end of the drum 76 through an opening 91 (Fig. 11) onto a movable inclined conveyor 92 which discharges the material downwardly into a trough 93 that has at one end thereof a blower 94 that is operatively connected to the engine shaft 74 by the endless drive belts 95 so as to cause the vines and open pods to be discharged laterally from one side of the machine. The beans and chaff fall through the drum 76 onto the endless apron 90 where the beans drop into a trough 96 (Fig. 10) and are transferred by the conveyor 97 to a bag 98 carried by the platform 75.

As the machine moves over the ground, the cradle frame and its associated parts are maintained in a substantially horizontal position irrespective of any rocking or tilting movement imparted to other parts of the machine, due to the fact that the cradle is pivotally suspended centrally of its length and at its ends, above the center of gravity of the machine and above the inclined apron 90, thus dispensing with the use of stabilizing means such as shown in our copending application, Serial No. 725,212. Moreover, the shock absorbing means 82 are connected to the main frame and the machine frame so that any lateral displacement of these parts, when travelling over uneven ground, is restrained or cushioned, thus increasing the efficiency of operation of the viner.

It will be understood that the forms of the invention shown and described are merely illustrative, and that such changes may be made as fall within the purview of the following claims.

We claim:

1. A mobile viner hulling machine including in combination, a main outer frame having longitudinally extending spaced side bars, a machine frame within the main frame, a cradle frame between the main frame and the machine frame, said cradle frame having spaced longitudinal side bars disposed adjacent the side bars of the main frame, said side bars having their longitudinal centers positioned above the center of gravity of the machine, means intermediate the ends of said side bars pivotally connecting the side bars of the cradle frame to the main frame, means for longitudinally adjusting the cradle frame relative to the main frame to properly balance the cradle frame on the main frame, means for maintaining the cradle frame in its balanced position, and means mounted on the opposite ends of the machine frame for pivotally connecting centrally the ends of the cradle frame thereto, the pivotal connection of the cradle frame to the main frame and the machine frame above the center of gravity of the machine providing means for maintaining the cradle frame level upon displacement of the main frame and the machine frame when the machine passes over uneven ground.

2. A mobile viner hulling machine including in combination, a main outer frame having longitudinally extending spaced side bars, a machine frame within the main frame, a cradle frame between the main frame and the machine frame, said cradle frame having spaced longitudinal side bars disposed adjacent the side bars of the main frame, said side bars having their longitudinal centers positioned above the center of gravity of the machine, means intermediate the ends of said side bars pivotally connecting the side bars of the cradle frame to the main frame, the side bars of the main frame centrally of their ends having aligned transverse openings, the side bars of said cradle frame intermediate their ends having elongated longitudinal slots registering with said openings, pivot pins mounted in said openings and slidable in said slots for longitudinally adjusting the cradle frame relative to the main frame to balance the cradle frame, means mounted on opposite ends of the machine frame for pivotally connecting centrally the ends of the cradle frame thereto and means maintaining the cradle frame in its longitudinally balanced position relative to the main frame.

3. A mobile viner hulling machine including in combination, a main outer frame having longitudinally extending spaced side bars, a machine frame within the main frame, a cradle frame between the main frame and the machine frame, said cradle frame having spaced longitudinal side bars disposed adjacent the side bars of the main frame, said side bars having their longitudinal centers positioned above the center of gravity of the machine, means intermediate the ends of said side bars pivotally connecting the side bars of the cradle frame to the main frame, the side bars of the main frame centrally of their ends having aligned transverse openings, the side bars of said cradle frame intermediate their ends having elongated longitudinal slots registering with said openings, pivot pins mounted in said openings and slidable in said slots for longitudinally adjusting the cradle frame relative to the main frame to balance the cradle frame, means maintaining the cradle frame in its longitudinally balanced position relative to the main frame, and means mounted on the opposite ends of the machine frame for pivotally connecting centrally the ends of the cradle frame thereto, the pivotal connection of the cradle frame to the main frame and the machine frame above the center of gravity of the machine providing means for maintaining the cradle frame level upon displacement of the main frame and the machine frame when the machine passes over uneven ground.

4. A mobile viner hulling machine including in combination, a main outer frame having longitudinally extending spaced side bars, a machine frame within the main frame, a cradle frame between the main frame and the machine frame, said cradle frame having spaced longitudinal side bars disposed adjacent the side bars of the main frame, said side bars having their longitudinal centers positioned above the center of gravity of the machine, means intermediate the ends of said side bars pivotally connecting the side bars of the cradle frame to the main frame, the side bars of the main frame centrally of their ends having aligned transverse openings, the side bars of said cradle frame intermediate their ends having elongated longitudinal slots registering with said openings, pivot pins mounted in said openings and slidable in said slots, collars loosely mounted on the pins and movable longitudinally in said slots, said collars having tangentially disposed plates extending longitudinally of the upper edges of said slots, the side bars of the cradle frame having inwardly extending angle members overlapping said plates, said plates and said members having vertical apertures arranged to register with one another, means extending through vertically aligned apertures for connecting the plates to said members when the side bars of the cradle frame are moved longitudinally to balancing position relative to the main frame, means mounted on opposite ends of the machine frame for pivotally connecting centrally the ends of the cradle frame thereto and means for maintaining the pivot pins and the cradle frame in their balanced position.

5. A mobile viner hulling machine including in combination, a main outer frame having longitudinally extending spaced side bars, a machine frame within the main frame, a cradle frame between the main frame and the machine frame, said cradle frame having spaced longitudinal side bars disposed adjacent the side bars of the main frame, said side bars having their longitudinal centers positioned above the center of gravity of the machine, means intermediate the ends of said side bars pivotally connecting the side bars of the cradle frame to the main frame, the side bars of the main frame centrally of their ends having aligned transverse openings, the side bars of said cradle frame intermediate their ends having elongated longitudinal slots registering with said openings, pivot pins mounted in said openings and slidable in said slots, collars loosely mounted on the pins and movable longitudinally in said slots, said collars having tangentially disposed plates extending longitudinally of the upper edges of said slots, the side bars of the cradle frame having inwardly extending angle members overlapping said plates, said plates and said members having vertical apertures arranged to register with one another, means extending through vertically aligned apertures for connecting the plates to said members when the side bars of the cradle frame are moved longitudinally to balancing position relative to the main frame, means for maintaining the pivot pins and the cradle frame in their balanced position, and means mounted on the opposite ends of the machine frame for pivotally connecting centrally the ends of the cradle frame thereto, the pivotal connection of the cradle frame to the main frame and the machine frame above the center of gravity of the machine providing means for maintaining the cradle frame level upon displacement of the main frame and the machine frame when the machine passes over uneven ground.

6. A mobile viner hulling machine including in combination, a main outer frame having longitudinally extending spaced side bars, a machine frame within the main frame and having upwardly extending pairs of arms at the ends thereof and spaced from the bars of the main frame, transverse members connecting the upper ends of said arms, a cradle frame between the main frame and the machine frame, said cradle frame having spaced longitudinal side bars adjacent the side bars of the main frame, said side bars having their longitudinal centers above the center of gravity of the machine, the side bars of the main frame centrally of their ends having aligned transverse openings, the side bars of said cradle frame intermediate their ends having elongated longitudinal slots registering with said openings, pivot pins mounted in said openings and slidable in said slots for longitudinally adjusting the cradle frame relative to the main frame to balance the cradle frame, means for maintaining the cradle frame in a longitudinally fixed position relative to the main frame when the cradle frame is balanced, and means mounted on said transverse members for pivotally connecting the ends of the cradle frame at their transverse centers to the machine frame, the pivotal connection of the cradle frame to the main frame and the machine frame above the center of gravity of the machine providing means for maintaining the cradle frame level upon displacement of the main frame and the machine frame when the machine passes over uneven ground.

7. A mobile viner hulling machine including in combination, a main outer frame having longitudinally extending spaced side bars, a machine frame within the main frame, a cradle frame between the main frame and the machine frame, said cradle frame having spaced longitudinal side bars disposed adjacent the side bars of the main frame, said side bars having their longitudinal centers positioned above the center of gravity of the machine, means intermediate the ends of said side bars pivotally connecting the side bars of the cradle frame to the main frame, and shock absorbing means connecting the main outer frame to the machine frame at the sides thereof for restraining lateral displacement of the main outer frame and the machine frame during the operation of the machine.

8. A viner hulling machine as called for in claim 2 having shock absorbing means connecting the machine frame to the main frame at the sides and ends of the machine frame to restrain lateral displacement of the machine frame and the main frame during the operation of the machine.

ROY RITTER.
WILLIAM RITTER.

REFERENCES CITED

The following references are of record in the file of this patent:

UNITED STATES PATENTS

| Number | Name | Date |
| --- | --- | --- |
| 1,672,588 | Turnidge et al. | June 5, 1928 |
| 2,100,005 | Gustafson | Nov. 23, 1937 |
| 2,440,550 | Martin | Apr. 27, 1948 |